(12) United States Patent
Shen et al.

(10) Patent No.: US 10,144,843 B2
(45) Date of Patent: Dec. 4, 2018

(54) EPOXY COMPOSITION

(71) Applicant: BLUE CUBE IP LLC, Midland, MI (US)

(72) Inventors: Yue Shen, Shanghai (CN); Fu Zhan, Shanghai (CN); Ray E. Drumright, Midland, MI (US); Yan Wu, Shanghai (CN)

(73) Assignee: Blue Cube IP LLC, St. Louis, MO (US)

(*) Notice: Subject to any disclaimer, the term of this patent is extended or adjusted under 35 U.S.C. 154(b) by 132 days.

(21) Appl. No.: 15/514,768

(22) PCT Filed: Sep. 30, 2014

(86) PCT No.: PCT/CN2014/087856
§ 371 (c)(1),
(2) Date: Mar. 27, 2017

(87) PCT Pub. No.: WO2016/049832
PCT Pub. Date: Apr. 7, 2016

(65) Prior Publication Data
US 2017/0210939 A1   Jul. 27, 2017

(51) Int. Cl.
| | | |
|---|---|---|
| *C09D 163/10* | (2006.01) |
| *C09D 163/04* | (2006.01) |
| *C08L 63/10* | (2006.01) |
| *C08G 59/32* | (2006.01) |
| *C08G 59/50* | (2006.01) |
| *C08G 59/62* | (2006.01) |
| *C08G 59/68* | (2006.01) |
| *C09D 5/00* | (2006.01) |
| *C08L 63/04* | (2006.01) |
| *C08G 59/14* | (2006.01) |

(52) U.S. Cl.
CPC ....... *C09D 163/04* (2013.01); *C08G 59/3218* (2013.01); *C08G 59/5026* (2013.01); *C08G 59/5033* (2013.01); *C08G 59/621* (2013.01); *C08G 59/688* (2013.01); *C08L 63/10* (2013.01); *C09D 5/00* (2013.01); *C09D 163/10* (2013.01)

(58) Field of Classification Search
None
See application file for complete search history.

(56) References Cited

U.S. PATENT DOCUMENTS

| | | | |
|---|---|---|---|
| 2016/0257848 A1* | 9/2016 | Li | C08G 18/58 |
| 2016/0264714 A1* | 9/2016 | Li | C08G 18/4829 |
| 2016/0272845 A1* | 9/2016 | Shen | C08G 18/6407 |
| 2016/0289369 A1* | 10/2016 | Chen | C08G 59/50 |

FOREIGN PATENT DOCUMENTS

| | | | |
|---|---|---|---|
| CN | 102876177 | 1/2013 | |
| JP | 2009132774 A * | 6/2009 | C08G 8/20 |
| KR | 20040005312 | 1/2004 | |
| KR | 101095312 | 12/2011 | |
| WO | 2009053581 | 4/2009 | |

OTHER PUBLICATIONS

Machine translation of JP-2009132774-A (no date).*
Machine translation of CN 102876177 A (no date).*
PCT/CN2014/087856 International Search Report dated May 8, 2015.

* cited by examiner

*Primary Examiner* — Michael J Feely
(74) *Attorney, Agent, or Firm* — Husch Blackwell LLP

(57) ABSTRACT

A modified epoxy novolac resin composition including a reaction product of: (a) a novolac epoxy resin compound, (b) a cardanol compound, and (c) a catalyst compound; and a process for preparing the above modified epoxy novolac resin composition such that the composition contains cardanol moieties in a concentration of at least 15 weight percent of the composition.

26 Claims, 3 Drawing Sheets

EPOXY COMPOSITION

FIELD

The present invention is related to a novel epoxy novolac composition and a process for preparing such composition.

BACKGROUND

Epoxy novolac resins contain a phenol-formaldehyde backbone and multiple epoxy groups attached to the backbone. The chemical structure of epoxy novolac resins offers several advantages in comparison with conventional bisphenol A (BPA) or bisphenol F (BPF) type epoxy resins, particularly with regard to solvent and chemical resistance in cured films. Thus, epoxy novolac resins have been widely used in tank linings and chemical storage tanks; such tanks require a higher demand on coating performance (related to solvent and chemical resistance) that cannot be provided by conventional BPA or BPF type epoxy resins. For example, an epoxy novolac resin commonly used for tank linings is DEN 438, an epoxy novolac resin commercially available from The Dow Chemical Company. However, typical epoxy novolac resins used for tank linings and chemical storage tanks usually have a high viscosity which results in a low solids content (for example, a volume solids of 50 percent (%) or less) and a high VOC (volatile organic compounds) (for example, a volume solids of greater than 50%) in coating formulations produced from such epoxy novolac resins such as when used in coatings and paints. Some of the epoxy novolac resins commercially available from The Dow Chemical Company and the resins' melt viscosities include for example:

| Epoxy Novolak Resin | Range of Melt Viscosity |
| --- | --- |
| D.E.N. 431 | 1,100–1,700 mPa · s @ 52° C. |
| D.E.N. 438 | 31,000–40,000 mPa · s @ 52° C. |
| D.E.N. 439 | 15,000–35,000 mPa · s @ 71° C. |

Driven by increasing awareness of environment protection from governments, paint formulators, and end users, currently there is a strong demand in the industry for high solid coating formulations (for example, a volume solids of greater than 50%) with low VOC (for example, a VOC of about 420 g/L or less). Moreover, high solid paint products could also give customers economic benefit by decreasing the amount of solvent usage in formulations and by simplifying the process of applying the formulations. A typical tank coating usually is made up of three epoxy novolac layers with a DFT (dry film thickness) of approximately (~) 100 µm for each layer. High solid paint can increase the DFT of each layer and may provide the capability of using a two-layer or even a one-layer coating system instead of the current three-layer coating system without sacrificing coating performance. Reducing the number of layers required for tank coatings from three coating layers may also greatly decrease coating application costs and increase coating application productivity.

Heretofore, many attempts have been made by those in the industry to increase the solid content of coating formulations and to achieve a high DFT for a single layer. For example, one approach is to use standard BPA or BPF type epoxy resins such as DER 331 and DER 354—bisphenol A/F type epoxy resins commercially available from The Dow Chemical Company. However, when using a bisphenol A/F type epoxy resin a thick film (for example, about 300 microns) is required to obtain adequate performance for use in coatings for storage tanks. In addition, the thick film based on bisphenol A/F epoxy resins usually has strong internal stresses, which easily result in formation of cracks in the film during curing and during the service period of the film. It is known to those skilled in the art that the higher the DFT of a layer, the higher the internal stresses in the layer; and it is difficult for the end user, such as paint applicators, to balance film thickness and crack resistance.

Another approach in an attempt to achieve high solids content in a coating formulation is to use, in the formulation, conventional cycloaliphatic amine or aromatic amine hardeners that have a low molecular weight and a low viscosity such as bis-(p-aminocyclohexyl) methane (PACM), 1,2-cyclohexane diamine (DACH), diethylenetriamine (DETA), meta-xylene diamine (MXDA) and the like. However, the low molecular weight amine hardeners have poor compatibility with epoxy novolac resins and need a long induction time. The poor compatibility problem is indicated when blushing occurs in the final film product. In addition, the poor compatibility property eventually leads to poor coating properties. Therefore, to avoid the above problems, a long induction time (for example, greater than 30 minutes) is necessary when low molecular weight amine hardeners are used. It is also difficult for the end user, such as paint applicators, to balance an acceptable induction time (for example, 15-30 minutes) and pot-life (for example, 1-2 hours) of coating formulations during application of the coating formulation.

WO 2009/126393 A2 discloses low temperature cure epoxy resin compositions and a process for preparing such epoxy resin compositions. The examples of WO 2009/126393 A2 describe a novolac epoxy resin, DEN 438, modified with 10%, 15% and 20% dodecylphenol; and with 9.5% 3-pentadecenylphenol (mole % phenol group per epoxy group), respectively. In coating formulations, the modified novolacs are cured with a phenalkamine type hardener; and the resultant coatings show a faster curing property, a non-sticky film surface property and a good appearance property, at both room temperature (e.g., 23° C.) and low temperature (e.g., 0° C.) curing conditions, than an unmodified DEN 438. Although WO 2009/126393 A2 does not provide any epoxy resin viscosity measurements, it has been found that a dodecylphenol modified novolac resin has a higher viscosity (for example, greater than 33,000 mPa·s at 70° C.) than DEN 438.

KR515624B1 discloses a weak solvent-soluble epoxy resin, a preparation method for such epoxy resin, and a paint composition with better corrosion resistance and chemical resistance than conventional BPA or BPF type epoxy resins. In general, the weak solvent-soluble epoxy resin of KR515624B1 is prepared via the following steps: (1) reacting an alkyl phenol having an alkyl group of C8 or more and an aldehyde to prepare a novolac resin; (2) reacting the novolac resin with an epoxy resin, wherein the ratio of the OH groups of the novolac resin to the epoxy group is 0.4-0.6 to 1 by equivalence; and (3) reacting the obtained reaction product from step (2) with ⅙ to ¹⁄₁₂ equivalence of an aliphatic acid per the epoxy group by addition reaction.

KR515624B1 further discloses that the alkyl phenol used is at least one selected from p-octylphenol, nonylphenol, p-dodecylphenol and cardanol; the aldehyde is formaldehyde, p-formaldehyde or acetaldehyde; and the epoxy resin is bisphenol A epoxy, bisphenol F epoxy, or a bifunctional polyglycidyl ether.

KR515624B1 describes a synthesis process for preparing an epoxy resin product reacting an alkyl phenol and an aldehyde, and then subsequently reacting the above resultant reaction product with an epoxy resin. The obtained product is then further reacted with an aliphatic acid to generate the final epoxy resin product. The alkyl phenols of KR515624B1 have an alkyl group of C8 or more and the epoxy resin of KR515624B1 is bisphenol A, bisphenol F, water-addition bisphenol A or a bifunctional polyglycidyl ether. KR515624B1 provides a complex process for producing a coating product with a structure different from coatings produced from typical epoxy novolac resin formulations.

"Preparation and Anticorrosive Performances of Polysiloxane-modified Epoxy Coatings Based on Polyaminopropylmethylsiloxane-containing Amine Curing Agent", J. Coat. Technol. Res., 8 (4), pp. 481-487, 2011 is an article that discloses preparing polysiloxane-modified epoxy coating formulations and using cardanol in the coating formulations as a compatibilizer. Cardanol is found to increase the miscibility of a hardener with epoxy resins and to improve the coating performance of formulations using the cardanol. In the above article, the cardanol is cold blended into the coating composition to act as compatibilizer. However, the final composition prepared by the process disclosed in the above article cannot be used to prepare a coating with adequate chemical resistance for use in a tank coating application.

SUMMARY

One embodiment of the present invention includes a novel modified epoxy novolac resin compound having the following chemical structure, Structure (I):

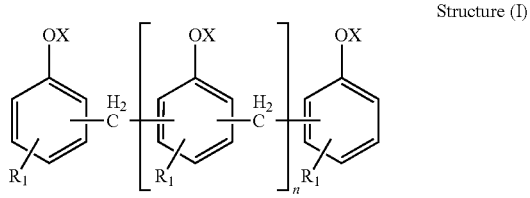

Structure (I)

wherein X is

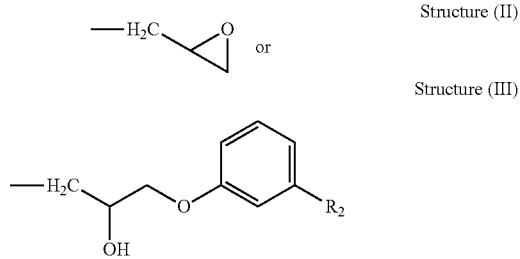

Structure (II)

or

Structure (III)

provided that at least one X is Structure (III); wherein the concentration of the Structure (III) moieties is at least 15 weight percent of the composition; wherein $R_1$ is hydrogen or an alkyl group having from $C_1$-$C_{12}$ carbon atoms; $R_2$ is a straight-chain alkyl with 15 carbons containing from 0 to 3 C=C bond(s) selected from —$C_{15}H_{31}$, —$C_{15}H_{29}$, —$C_{15}H_{27}$, and —$C_{15}H_{25}$; and n is a numeral from 1 to about 10.

The above modified epoxy novolac resin compound is useful for various enduse applications such as coatings; and more specifically, for applications requiring chemical resistance including for example tank coatings.

In another embodiment, the present invention includes a modified epoxy novolac resin composition derived from a high purity cardanol compound (for example, a cardanol product containing a cardanol content of greater than [>] 80 weight percent as one component to produce the modified epoxy novolac resin composition. For example, in one preferred embodiment, the modified epoxy novolac resin composition includes a reaction product of: (a) an epoxy resin such as DEN 438 (an epoxy novolac resin commercially available from The Dow Chemical Company), (b) a cardanol product having a purity of at least 80 percent or greater, (c) a catalyst such as ethyl triphenyl phosphonium acetate, and (d) optionally, a solvent such as xylene; and wherein the modified epoxy novolac resin composition contains a concentration of the cardanol derived moieties of at least 15 weight percent of the composition.

Surprisingly, the modified epoxy novolac resin composition of the present invention exhibits a much lower viscosity (which can be for example, less than about 3,000 mPa·s at 70° C.) than the viscosity of the starting unmodified epoxy novolac (which can be for example, about 4,500 mPa·s at 70° C.). In addition, the modified epoxy novolac resin composition surprisingly exhibits much better compatibility (as indicated by no blushing occurring in the coating) with conventional amine hardeners (for example, amine hardeners such as MXDA and PACM) than the compatibility of the starting unmodified epoxy novolac with the same amine hardeners. The performance evaluation of clear coats made from the modified epoxy novolac resin composition unexpectedly shows that the modified epoxy novolac resin composition extends the pot-life (for example, from 1 hour to more than 2 hours) of a curable formulation utilizing the modified epoxy novolac resin composition; and endows the cured films made from the curable formulation with excellent flexibility, impact resistance and chemical resistance.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

Figure 1:
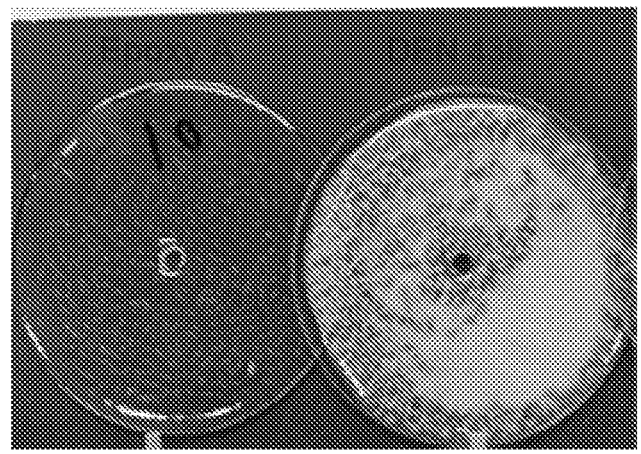
FIG. 1 is a photograph of cured films of Epoxy A (from Example 1) and DEN 438 with PACM.

One embodiment of the present invention is directed to a modified epoxy novolac resin composition including a reaction product of: (a) an epoxy resin, (b) a cardanol product having a purity of at least 80 percent, and (c) a catalyst.

Other optional additives known to the skilled artisan can be included in the composition such as for example (d) a solvent and other additives for various enduse applications.

In one embodiment, the modified epoxy novolac resin composition of the present invention in general contains a concentration of the cardanol derived moieties of at least 15 weight percent (wt %) of the composition. These cardanol derived moieties include, for example, the Structure (III) moieties for X when X is Structure (III) in the chemical formula Structure (I) described above. In another embodiment, the modified epoxy novolac resin composition of the present invention contains a concentration of the cardanol derived moieties of the from about 15 wt % to about 40 wt %, from about 20 wt % to about 35 wt % in still another embodiment, and from about 25 wt % to about 30 wt % in yet another embodiment. In mole percent (mole %), the modified epoxy novolac resin composition of the present invention has at least 30 mole % of the epoxy functionality of the original epoxy novolak reacted with cardanol in one embodiment, from about 30 mole % to about 60 mole % in another embodiment, from about 35 mole % to about 55 mole % in still another embodiment, and from about 40 mole % to about 50 mole % in yet another embodiment.

In preparing the modified epoxy novolac resin composition of the present invention, at least one novolac epoxy compound starting material, component (a), can be used. For example, the novolac epoxy compound useful in the present invention may include any conventional novolac epoxy compound such as for example, glycidyl ether derivatives of novolac type resins.

One embodiment of the novolac epoxy compound used to prepare the epoxy novolac resin composition of the present invention, may be for example one or more novolac epoxy compounds known in the art such as any of the novolac epoxy compounds described in Lee, H. and Neville, K., *Handbook of Epoxy Resins*, McGraw-Hill Book Company, New York, 1967, Chapter 2, pages 2-1 to 2-27, incorporated herein by reference. In a preferred embodiment, the novolac epoxy compound may include for example, but is not limited to, epoxy resins based on glycidyl ether derivatives of o-cresol novolacs, hydrocarbon novolacs, and phenol novolacs. The epoxy compound may also be selected from, but is not limited to, commercially available novolac epoxy resin products such as for example, D.E.N. 425, D.E.N. 431, D.E.N. 438, or D.E.N. 439 which are novolac epoxy resins available from The Dow Chemical Company; and mixtures thereof.

Generally, the amount of novolac epoxy resin compound useful in preparing the modified epoxy novolac resin composition, may be for example, from 40 wt % to about 85 wt % in one embodiment, from about 45 wt % to about 80 wt % in another embodiment; from about 50 wt % to about 75 wt % in still another embodiment; and from about 55 wt % to about 70 wt % in yet another embodiment, based on the total weight of the modified epoxy novolac resin.

Preparation of the modified epoxy novolac resin composition also includes a high purity cardanol as component (b). By "high purity", herein with reference to a cardanol composition, generally means, for example, a cardanol composition containing a cardanol content of at least greater than about 80 percent (%) in one embodiment, greater than about 85% in another embodiment, greater than about 90% in still another embodiment, and greater than about 95% in yet another embodiment. In another embodiment, the high purity cardanol, i.e., the range of cardanol content of the cardanol component (b) can be from about 80% to about 100%, from about 85% to about 100% in still another embodiment, from about 90% to about 100% in yet another embodiment, and from about 95% to about 100% in even still another embodiment.

Generally, the amount of cardanol component (b) useful in preparing the modified epoxy novolac resin composition, may be for example, from 15 wt % to about 60 wt % in one embodiment, from about 20 wt % to about 55 wt % in another embodiment; from about 25 wt % to about 50 wt % in still another embodiment; and from about 30 wt % to about 45 wt % in yet another embodiment, based on the total weight of the modified epoxy novolac resin.

The catalyst compound useful in the process for producing the modified epoxy novolac resin composition can be for example, but is not limited to, basic inorganic reagents, phosphines, quaternary ammonium compounds, phosphonium compounds or mixtures thereof.

In one preferred embodiment, the catalyst compound useful for preparing the modified epoxy novolac resin composition may include for example, but is not limited to, phosphonium compounds such as ethyl triphenyl phosphonium acetate, acetate, imidazole, and triethylamine and mixtures thereof.

Generally, the amount of catalyst useful in preparing the modified epoxy novolac resin composition, may be for example, from 0.002 wt % to about 0.1 wt % in one embodiment, from about 0.005 wt % to about 0.05 wt % in another embodiment; from about 0.01 wt % to about 0.02 wt % in still another embodiment; and from about 0.015 wt % to about 0.02 wt % in yet another embodiment, based on the total weight of the modified epoxy novolac resin.

An optional component that can be used in preparing the modified epoxy novolac resin composition may include for example a solvent which can be used during or after the synthesis process for producing the modified epoxy novolac resin composition by the process of the present invention. The solvent can be used to further reduce the viscosity of the resultant product.

The solvent compound useful in the present invention can include for example, but is not limited to, an organic solvent such as ethers, hydrocarbons, ketones, esters, aliphatic ethers, cyclic ethers, aliphatic, cycloaliphatic and aromatic hydrocarbons, and combinations thereof.

In one preferred embodiment, the organic solvent can include for example, but is not limited to, butyl acetate, xylene, acetone, methanol, butanol, benzyl alcohol, dioxane, tetrahydrofuran (THF), hexane, heptanes, octanes, toluene, pentane, cyclohexane, methylcyclohexane, methylethyl ketone, methylisobutyl ketone, methylcyclohexane, cyclohexanone, cyclopentanone, diethyl ether, 1,4-dioxane, dichloromethane, chloroform, ethylene dichloride, methyl chloroform, tert-butyl ether, dimethyl ether; and mixtures thereof.

Generally, the amount of solvent used in the present invention should be sufficient to reduce the viscosity of the modified epoxy novolac resin composition to below about 2,000 mPa·s. For example, a weight ratio of solvent to epoxy may be from about 50:50 to about 5:95 in one embodiment, from about 45:55 to about 10:90 in another embodiment; and from about 35:65 to about 20:80 in still another embodiment.

The modified epoxy novolac resin composition of the present invention is a reaction product resulting from the reaction of a novolac epoxy resin with a cardanol in the presence of a catalyst and, optionally, in the presence of a solvent.

Advantageously, the present invention process starts with a typical epoxy novolac resin which has been prepared based on the condensation of phenol and formaldehyde, and then reacted with epichlorohydrin generating a typical epoxy novolac such as DEN438, a readily available epoxy novolac resin commercially available from The Dow Chemical Company. The typical epoxy novolac resin is then modified with cardanol having an alkyl group of C15 carbon atoms. The process of the present invention is thus much simpler than other known prior art processes.

In general, the reaction process for producing the modified epoxy novolac resin composition of the present invention includes admixing at least one novolac epoxy compound and cardanol at the appropriate concentrations, and optionally, any other optional ingredient as desired, such as a solvent; and then contacting the mixture with a catalyst at a predetermined temperature and reaction time to carry out the reaction of the reaction mixture. Once the reaction is completed, any other components in the formulation such as the optional catalyst can be filtered off and the solvent evaporated to give the modified novolac epoxy resin composition product. The preparation of the modified epoxy novolac resin composition, and/or any of the steps thereof, may be a batch or a continuous process. The equipment employed to carry out the reaction includes equipment known to those skilled in the art.

In a preferred embodiment, the reaction is carried out at process conditions to enable the preparation of an effective modified epoxy novolac resin composition having the desired balance of properties for a particular application. For example, generally, the reaction can be carried out at atmospheric pressure, superatmospheric pressures, or subatmospheric pressures.

Generally, the reaction temperature for preparing the modified epoxy novolac resin composition can be in the range of from about 100° C. to about 200° C. in one embodiment, from about 130° C. to about 170° C. in another embodiment, and from about 140° C. to about 160° C. in still another embodiment. Below a temperature of 100° C., the reaction will occur at a lower rate; and above the temperature 200° C., the reaction will produce side reactions and the resulting composition will have a higher viscosity.

The reaction time may be generally from about 0.5 hour to about 8 hours in one embodiment, from about 1 hour to about 6 hours in another embodiment, and from 2 hours to about 4 hours in still another embodiment.

As an illustration of one preferred embodiment for producing the modified epoxy novolac resin composition of the present invention, the following chemical reaction scheme, SCHEME (A), shows a modified epoxy novolac resin composition produced via the process of the present invention.

SCHEME (A)

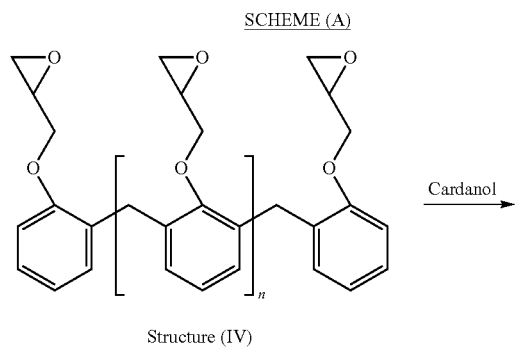

Structure (IV)

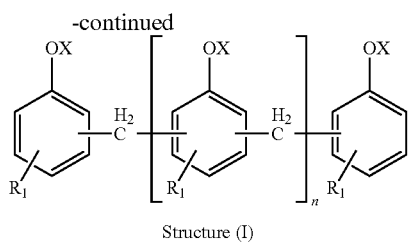

Structure (I)

wherein X, $R_1$, $R_2$, and n of Structures (I) and (IV) are as first defined above with reference to Structure (I).

In another preferred embodiment of the method for preparing the modified epoxy novolac resin composition, generally the method includes the following steps: (a) charging cardanol and epoxy novolac resin into a reactor, (b) while stirring the mixture, heating to about 90° C., (c) adding a catalyst, for example ethyl triphenyl phosphonium acetate, to the reaction mixture, and (d) raising the reaction temperature up to as high as 160° C. to start the reaction process. The reaction can then be stopped after about 3 hours, wherein a modified epoxy novolac resin composition is formed.

Upon producing the modified epoxy novolac resin composition by the above process, optionally, the catalyst may be separating from the product by separation techniques known in the art such as filtration, decantation, or centrifugation.

The modified epoxy novolac resin composition prepared by the process of the present invention is a novel composition with unexpected and unique properties. For example, it has been found that a cardanol modified epoxy novolac resin composition of the present invention shows a lower viscosity while a dodecylphenol modified novolac of the prior art shows a higher viscosity than the parent unmodified novolak, DEN 438 (see the Comparative Examples herein below). Thus, a cardanol modified epoxy novolac resin composition can be used in high solids formulations to achieve further benefits such as low VOC (volatile organic compounds), and high DFT (dried film thickness).

Surprisingly, in one embodiment, the modified epoxy novolac resin composition exhibits a much lower viscosity than the viscosity of the starting unmodified epoxy novolac resin. More specifically, the modified epoxy novolac resin composition exhibits a viscosity of less than or equal to (≤) about 4,000 mPa·s at 70° C. Generally, the viscosity of the modified epoxy novolac resin composition can be from about 500 mPa·s to about 4,000 mPa·s in one embodiment, from about 1,000 mPa·s to about 4,000 mPa·s in another embodiment, from about 1,500 mPa·s to about 2,500 mPa·s in still another embodiment, and from about 1,600 mPa·s to about 2,200 mPa·s in yet another embodiment at 70° C.

Because the modified epoxy novolac resin composition product has a low viscosity described above relative to the starting epoxy novolac resin used to produce the product, the product can be used without using solvents or diluents for the sole purpose of reducing the viscosity of the product if desired. The modified epoxy novolac resin composition of the present invention is easily processed and readily handled in enduse processes for forming other products.

Besides lowering the viscosity and improving the processability, the modified epoxy novolac resin composition also surprisingly exhibits a much better compatibility with small molecule amine hardeners than does the starting unmodified epoxy novolac. For example, compatibility can be quantitatively measured as follows: the induction time needed to achieve a transparent film (without blushing) observed by the naked eye. The ranges of compatibility (induction time) of the modified epoxy novolac resin composition include from about 10 minutes (min) to about 60 min in one embodiment, from about 15 min to about 40 min in another embodiment, and from about 20 min to about 30 min in still another embodiment.

Also, the modified epoxy novolac resin composition can be a relatively less costly as compared to similar epoxy novolac resins known in the art.

One embodiment of the present invention is directed to a curable resin composition or formulation including (I) the modified epoxy novolac resin composition described above; and (II) a hardener compound. Other optional additives known to the skilled artisan can be included in the formulation such as for example a curing catalyst, pigments, extenders, solvents and/or other additives for various enduse applications.

The curable formulation of the present invention includes at least the modified epoxy novolac resin composition product as described above as component (I) to form the epoxy matrix in a final curable composition or formulation. The curable formulation can then be cured to form a cured product or thermoset, and more specifically a cured enduse product such as a cured coating film.

Generally, the amount of the modified epoxy novolac resin composition used in the curable formulation of the present invention will depend on the enduse of the curable formulation. For example, as one illustrative embodiment, when the curable formulation is used to prepare a coating, the concentration of the modified epoxy novolac resin composition can be generally from about 20 wt % to about 90 wt % in one embodiment, from about 25 wt % to about 80 wt % in another embodiment; and from about 30 wt % to about 70 wt % in still another embodiment; based on the weight of the curable formulation.

In general, the hardener (also referred to as a curing agent or crosslinking agent), component (II), is blended with the modified epoxy novolac resin composition, component (I), to prepare the curable composition or formulation. The curable formulation can then be cured to form a cured product or thermoset.

Generally, the amount of hardener used in the curable formulation of the present invention will depend on the enduse of the curable composition. For example, as one illustrative embodiment, when the curable formulation is used to prepare a coating, the epoxy resins are formulated with the hardeners at an epoxide to amine hydrogen (NH) equivalent ratio of from about 0.3:1 to about 1.3:1 in one embodiment, from about 0.6:1 to about 1.2:1 in another embodiment, and from about 0.7:1 to about 1.0:1 in still another embodiment.

In preparing the curable resin formulation, optional compounds may be used in the formulation including for example at least one cure catalyst/accelerator to facilitate the reaction of the modified epoxy novolac resin composition with the curing agent or hardener. The curing catalyst useful in the present invention may include for example, but is not limited to, benzyl alcohol, 2,4,6-tris-(N,N-dimethyl-aminomethyl)-phenol, salicylic acid, or any combination thereof.

Generally, the amount of cure catalyst when used in the curable resin formulation may be for example, from 0 wt % to about 10 wt % in one embodiment, from about 0.01 wt % to about 5 wt % in another embodiment; from about 0.1 wt % to about 4 wt % in still another embodiment; and from about 1 wt % to about 3 wt % in yet another embodiment base on the total weight of the curable resin formulation.

Other optional compounds that may be added to the curable formulation of the present invention may include compounds that are normally used in resin formulations known to those skilled in the art for preparing curable compositions and thermosets. For example, the optional components may comprise compounds that can be added to the composition to enhance application properties (e.g., surface tension modifiers or flow aids), reliability properties (e.g., adhesion promoters) the reaction rate, the selectivity of the reaction, and/or the catalyst lifetime.

Other optional compounds that may be added to the curable formulation may include, for example, an epoxy compound different from the modified epoxy novolac resin composition product described above such as blending other conventional novolac epoxy resins or BPA/BPF epoxy resins with the modified novolac epoxy resin composition; pigments; fillers; de-molding agents; other accelerators; a solvent to lower the viscosity of the formulation further; other resins such as a phenolic resin that can be blended with the other ingredients in the curable formulation; other curing agents; toughening agents; flow modifiers; adhesion promoters; reactive diluents; stabilizers; plasticizers; catalyst deactivators; flame retardants; and mixtures thereof.

Generally, the amount of other optional components, when used in the present invention, may be for example, from 0 wt % to about 80 wt % in one embodiment, from about 0.01 wt % to about 60 wt % in another embodiment; from about 0.1 wt % to about 50 wt % in still another embodiment; from about 1 wt % to about 45 wt % in yet another embodiment, and from about 10 wt % to about 40 wt % in even still another embodiment.

The process for preparing the curable formulation of the present invention includes admixing (I) the modified epoxy novolac resin composition product as described above; (II) at least one hardener compound; and (III) optionally, any other optional ingredients as desired and described above. For example, the preparation of the curable resin formulation is achieved by blending, in known mixing equipment, the modified novolac epoxy resin composition product, the hardener, and optionally any other desirable additives. Any of the above-mentioned optional additives, for example a curing catalyst, may be added to the composition during the mixing or prior to the mixing to form the formulation.

All the compounds of the curable formulation are typically mixed and dispersed at a temperature enabling the preparation of an effective curable epoxy resin formulation having the desired balance of properties for a particular application. For example, the temperature during the mixing of all components may be generally from about −10° C. to about 40° C. in one embodiment, and from about 0° C. to about 30° C. in another embodiment. Lower mixing temperatures help to minimize reaction of the epoxide and hardener in the composition to maximize the pot life of the composition.

The preparation of the curable formulation, and/or any of the steps thereof, may be a batch or a continuous process. The mixing equipment used in the process may be any vessel and ancillary equipment well known to those skilled in the art.

Some of the benefits of the curable formulation may include for example, low viscosity, high solids, and low VOC (volatile organic compounds). For example, the curable formulation prepared by the above process using the modified epoxy novolac resin composition advantageously exhibits a low viscosity for example a viscosity of less than or equal to (≤) about 1,500 mPa·s at 25° C. Generally, the viscosity of curable formulation can be from about 10 mPa·s to about 1,500 mPa·s in one embodiment, from about 10 mPa·s to about 1,000 mPa·s in another embodiment, and from about 10 mPa·s to about 500 mPa·s in still another embodiment at 25° C.

Because the curable formulation has a low viscosity as described above, the curable formulation can be used without using solvents or diluents for the sole purpose of reducing the viscosity of the curable formulation's processability. In other words, the curable formulation can be easily processed and readily handled in enduse processes for forming thermoset products.

Also, the curable formulation prepared by the above process using the modified epoxy novolac resin composition advantageously exhibits a high solids content for example a solids content of greater than or equal to ($\geq$) about 50 volume percent (vol %). Generally, the solids content of the curable formulation can be from about 50 vol % to about 95 vol % in one embodiment, from about 60 vol % to about 90 vol % in another embodiment, and from about 65 vol % to about 85 vol % in still another embodiment.

Another benefit of the curable formulation includes a curable formulation that advantageously exhibits low VOC content for example a VOC content of $\leq$about 420 g/L. Generally, the VOC content of the curable formulation can be from about 50 g/L to about 420 g/L in one embodiment, from about 100 g/L to about 400 g/L in another embodiment, and from about 150 g/L to about 350 g/L in still another embodiment.

In addition, the curable formulation can include a wide range of hardeners including small molecule amine hardeners which is attributable to the modified epoxy novolac resin composition product of the present invention being used in the formulation because of the compatibility of the modified epoxy novolac resin composition with various hardeners including small molecule amine hardeners as described above.

Furthermore, based on performance evaluation of thermosets, such as clear coats made from the formulation containing the modified epoxy novolac resin composition of the present invention, the pot-life of the curable formulation utilizing the modified epoxy novolac resin composition can be unexpectedly extended. For example, the pot-life of the curable formulation can be quantitatively measured via monitoring the viscosity change of coatings; and the time of "viscosity double" and "viscosity to 2,000 mPa·s" can be recorded as "pot-life". The range of the pot-life of the curable formulation may generally include, for example, greater than or equal to 60 minutes (1 hour) in one embodiment, from about 1 hour to about 8 hours in another embodiment, from about 1.5 hour to about 5 hours in another embodiment, and from about 2 hours to about 3 hours in still another embodiment.

The curable formulation, when cured, endows the cured thermosets such as films made from the curable formulation with other properties such as excellent flexibility, impact resistance, and chemical resistance which can be attributable to the modified epoxy novolac resin composition product of the present invention being used in the formulation. The properties of the cured thermoset product can be measured by standard techniques and conventional methods known in the art.

Another embodiment of the present invention includes curing the curable resin formulation discussed above to form a thermoset or cured article.

The process of curing of the curable formulation may be carried out at a predetermined temperature and for a predetermined period of time sufficient to cure the formulation. The curing may be dependent on the hardener used in the formulation or other optional additives included in the formulation. However, adjustments to the formulation can be made by one skilled in art depending on the desired enduse product to be manufactured. In one embodiment, for example, the temperature of curing the formulation may be generally from about −10° C. to about 200° C.; from about 10° C. to about 190° C. in another embodiment; and from about 20° C. to about 175° C. in still another embodiment The curable formulation of the present invention may be used to manufacture a cured thermoset product for various applications. The cured product (i.e., the cross-linked product made from the curable formulation) of the present invention shows several improved properties over conventional cured thermosets made from curable compositions containing unmodified novolac epoxy resin.

For example, the cured product of the present invention exhibits a glass transition temperature generally of between about 40° C. and about 150° C. in one embodiment, between about 50° C. and about 120° C. in another embodiment, and between about 60° C. and about 100° C. in still another embodiment. The Tg of the cured product can be measured by the method described in ASTM D696 wherein the samples were heated at 10° C.·min$^{-1}$ from about 0° C. to 220° C. to determine Tg.

Furthermore, the cured product exhibits an increase in chemical resistance. Techniques for measuring the chemical resistance of cured product are known in the art. For example, chemical resistance generally can be evaluated by observation of any signs of deterioration of the cured product, such as a cured coating, in accordance with a grading or rating procedure described in ISO 4628-2, which rates the density and size of blisters by means of the pictorial standards. These pictorial standards illustrate blisters based on their respective densities as a rating of 2, 3, 4 and 5; and each density in sizes of 2, 3, 4 and 5.

Evaluating the grade of deterioration of the cured coating can be carried out after the coating is subjected to an immersion test. For example, the immersion test method described in ISO 2812 can be used. After such immersion test, the grading procedure described in ISO 4628-2 can be performed to obtain a rating scale for chemical resist.

In one embodiment, the chemical resistance of a cured product made using a modified epoxy novolac resin composition versus the chemical resistance of a cured product made using a conventional novolac resin can be illustrated by the following Table A wherein a numerical rating scale of 0-5 for density is used wherein "0" for density means that, desirably, no blistering is observed; and "5" for density means that, undesirably, dense blistering is observed. In addition; a numerical rating scale of 0-5 for size is used wherein "0" for size means that, desirably, no blistering is observed; and "5" for size means that, undesirably, relatively big blisters is observed.

TABLE A

| Chemical Resistance | | |
|---|---|---|
| Chemical Used for Resistance Test, Time | Modified Epoxy Novolac Resin | DEN438 Novolac Resin |
| 10% HCOOH, 3 hours | Blister: 0 | Blister: peel off |
| 5% CH$_3$COOH | Blister: 0 | Blister: peel off |
| CH$_3$OH, 4 weeks | Blister: 0 | Blister: D5(S2) |
| 20% HNO$_3$, 4 days | Blister: 0 | Blister: D5(S5) |
| 10% H$_2$SO$_4$, 1 week | Blister: 0 | Blister: D3(S5) |
| 70% H$_2$SO$_4$, 4 weeks | Blister: 0 | Blister: peel off |

While not intended to be limited thereby, it is hypothesized that the improved chemical resistance of the present invention cured product such as coatings may be due to increased hydrophobic property offered by the long aliphatic chain of the cardanol component.

Other beneficial properties of the cured product can be measured as determined based on the desired end use of the curable formulation and the cured product. For example, the modified novolac epoxy resin formulation of the present invention can be used for preparing a coating wherein the cured coating product exhibits a combination, i.e., a balance, of advantageous properties required for such coating enduse including for example processability, Tg, mechanical performance and chemical resistance performance.

EXAMPLES

The following examples and comparative examples further illustrate the present invention in detail but are not to be construed to limit the scope thereof.

Various terms and designations used in the following examples are explained and described in Table I as follows:

TABLE I

Materials

| Material | Function | Main Composition | Supplier |
| --- | --- | --- | --- |
| ethyl triphenyl phosphonium acetate | catalyst | ethyl triphenyl phosphonium acetate | The Dow Chemical Company |
| DEN 438 | epoxy material | epoxy novolac | The Dow Chemical Company |
| HD-F170 | cardanol material | cardanol ~85% | Huada Saigao Co., Ltd |
| HD-F180 | cardanol material | cardanol ~95% | Huada Saigao Co., Ltd |
| 4-dodecylphenol (4-DDP) | alkyl phenol material | 4-DDP | Wanfengyuan Ltd. |
| 4,4'-diaminodicyclohexylmethane (PACM) | epoxy hardener | PACM | Air Products |
| m-xylylenediamine (MXDA) | epoxy hardener | MXDA | Air Products |
| xylene | solvent | xylene | Sinopharm Co., Ltd |
| propylene glycol methyl ether (PM) | solvent | PM | The Dow Chemical Company |
| butyl cellosolve (BCS) | solvent | BCS | The Dow Chemical Company |

Example 1—Synthesis of Cardanol Modified Epoxy Novolac

In this example, 911 grams (g) of DEN 438 epoxy resin and 503.5 g of cardanol (HD-F180, cardanol ~95%) were charged into a four-neck 3 L glass flask equipped with a mechanical stirrer, a condensation tube, and a nitrogen charging adapter. After raising the temperature of the flask contents to 90° C., 250 parts per million (ppm) ethyl triphenyl phosphonium acetate (70% solution in methanol) was charged into the flask. Then, the reaction temperature of the resultant reaction mixture in the flask was raised to 160° C. The viscosity and epoxy equivalent weight (EEW) of the reaction mixture was monitored during the reaction. The reaction was stopped after about 3 hours (hr). The product formed from the reaction of this example was a cardanol modified epoxy novolac ("Epoxy A"). The Epoxy A product was allowed to cool to room temperature (about 25° C.).

Example 2—Synthesis of Cardanol Modified Epoxy Novolac

In this example, the same procedure described in Example 1 above was followed except that 911 g of DEN 438 epoxy resin and 503.5 g of cardanol (HD-F170, cardanol ~85%) were charged into the flask described in Example 1. The product formed from the reaction of this example was a cardanol modified epoxy novolac ("Epoxy B").

Example 3—Synthesis of Cardanol Modified Epoxy Novolac

In this example, the same procedure described in Example 1 above was followed except that 911 g of DEN 438 epoxy resin and 503.5 g of cardanol (cardanol 80%) were charged into the flask described in Example 1. The product formed from the reaction of this example was a cardanol modified epoxy novolac ("Epoxy C").

Comparative Example 1—Synthesis of Cardanol Modified Epoxy Novolac

In this example, the same procedure described in Example 1 above was followed except that 911 g of DEN 438 epoxy resin and 503.5 g of cardanol (cardanol ~75%) were charged into the flask described in Example 1. The product formed from the reaction of this example was a cardanol modified epoxy novolac ("Epoxy D").

Comparative Example 2—Synthesis of Cardanol Modified Epoxy Novolac

In this example, the same procedure described in Example 1 above was followed except that 911 g of DEN 438 epoxy resin and 503.5 g of cardanol (cardanol ~70%) were charged into the flask described in Example 1. The product formed from the reaction of this example was a cardanol modified epoxy novolac ("Epoxy E").

Comparative Example 3—Synthesis of Cardanol Modified Epoxy Novolac

In this example, the same procedure described in Example 1 above was followed except that 911 g of DEN 438 epoxy resin and 503.5 g of cardanol (cardanol 65%) were charged into the flask described in Example 1. The product formed from the reaction of this example was a cardanol modified epoxy novolac ("Epoxy F").

Comparative Example 4—Synthesis of 4-DDP Modified Epoxy Novolac

In this example, the same procedure described in Example 1 above was followed except that 200 g of DEN 438 epoxy resin and 98 g of 4-DDP were charged into the flask described in Example 1. The product formed from the reaction of this example was a cardanol modified epoxy novolac ("Epoxy G").

Viscosity Comparison

Table II describes the viscosity measurements of eight epoxy resins: DEN 438 (Comparative Example 5) and the seven modified epoxy novolacs: Epoxy A, Epoxy B, and Epoxy C prepared above in Example 1, Example 2, and Example 3, respectively; and Epoxy D, Epoxy E, Epoxy F, and Epoxy G prepared above in Comparative Example 1, Comparative Example 2, Comparative Example 3, and Comparative Example 4, respectively. For the cardanol modified epoxy novolacs based on high purity cardanol (≥80%), the viscosities (at 70° C.) of the neat resin decreased from 4,650 mPa·s (DEN 438) to 1,875 mPa·s for Epoxy A; to 2,475 mPa·s for Epoxy B, and to 3,450 mPa·s for Epoxy C.

However, the cardanol modified epoxy novolacs based on low purity cardanol (<80%) had a higher viscosity than DEN 438 resin. And, the viscosity of 4-DDP modified novolac (Epoxy G) showed a higher viscosity than DEN 438 resin. The viscosity (70° C.) of the neat resin increased from 4,650 mPa·s (DEN 438) to 33,000 mPa·s for Epoxy G (Comparative Example 4). The results described in Table II indicate that modified epoxy novolacs based on 4-DDP and low purity cardanol (<80%) have a higher viscosity than the viscosity of the epoxy resins (Epoxy A, Epoxy B, and Epoxy C) useful in the present invention.

TABLE II

| Example No. | Epoxy Resin | Type | Viscosity (neat, 70° C.) |
|---|---|---|---|
| Example 1 | Epoxy A | cardanol modified epoxy novolac | 1,875 mPa-s |
| Example 2 | Epoxy B | cardanol modified epoxy novolac | 2,475 mPa-s |
| Example 3 | Epoxy C | cardanol modified epoxy novolac (cardanol purity 80%) | 3,450 mPa-s |
| Comparative Example 1 | Epoxy D | cardanol modified epoxy novolac (cardanol purity 75%) | 4,800 mPa-s |
| Comparative Example 2 | Epoxy E | cardanol modified epoxy novolac (cardanol purity 70%) | 7,350 mPa-s |
| Comparative Example 3 | Epoxy F | cardanol modified epoxy novolac (cardanol purity 65%) | 11,025 mPa-s |
| Comparative Example 4 | Epoxy G | 4-DDP modified epoxy novolac | 33,000 mPa-s |
| Comparative Example 5 | DEN 438 | — | 4,650 mPa-s |

Example 4 and Comparative Example 6—Compatibility with PACM

The Epoxy A product produced in Example 1 and DEN 438 were each mixed with 20 wt % xylene to provide a composition having a viscosity capable of being more readily processed into a clear coating; and capable of being handled for evaluating and measuring the performance of such compositions. Although the initial viscosity of Epoxy A resin is reduced and is beneficial for VOC, a small amount of solvent can be used to facilitate handling and applying the resin formulation.

Table III describes clear coat formulations of Epoxy A mixed with 20 wt % xylene and DEN 438 mixed with 20 wt % xylene, respectively, with PACM, an amine hardener. Each of the formulations was mixed for 5 min and then the mixtures were applied on a glass plate without induction time. Cured films from the formulations resulted.

TABLE III

| Clear Coat Formulations | | | |
|---|---|---|---|
| Material | EEW/AHEW | Example 4 | Comparative Example 6 |
| 80% Epoxy A in xylene | 539 | 100.00 | |
| 80% DEN438 in xylene | 223 | | 110.00 |
| PACM | 52.5 | 9.74 | 25.90 |
| xylene | | 18.13 | 26.81 |
| Total | | 127.87 | 162.71 |
| Weight solid | | 0.70 | 0.70 |

As shown in FIG. 1, there is an obvious white phase separation portion in the DEN 438 cured film, indicating poor compatibility of DEN 438 resin with PACM hardener. The Epoxy A cured film, on the other hand, is almost transparent due to better compatibility with PACM. The above results illustrate that Epoxy A has a much better compatibility with PACM hardener than the compatibility of DEN 438 with PACM.

Example 5 and Comparative Example 7—Compatibility with MXDA

The Epoxy A product produced in Example 1 and DEN 438 were each mixed with 20 wt % xylene as in Example 3 and Comparative Example 3.

Table IV describes clear coat formulations of Epoxy A mixed with 20 wt % xylene and DEN 438 mixed with 20 wt % xylene, respectively, and further mixed with MXDA, an amine hardener. Each of the formulations was mixed for 5 min and then applied on a glass plate each with different induction times. Cured films from the formulations resulted.

TABLE IV

Clear Coat Formulations

| Material | EEW/AHEW | Example 5 | Comparative Example 7 |
|---|---|---|---|
| 80% DEN438 in xylene | 223 | | 100.00 |
| 80% Epoxy A in xylene | 539 | 100.00 | |
| MXDA | 34 | 6.31 | 15.25 |
| PM | | 4.82 | 5.18 |
| xylene | | 0.00 | 1.50 |
| BCS | | 9.64 | 10.36 |
| n-butanol | | | |
| Total | | 120.76 | 132.29 |
| Weight solid | | 0.72 | 0.72 |

Figure 2:
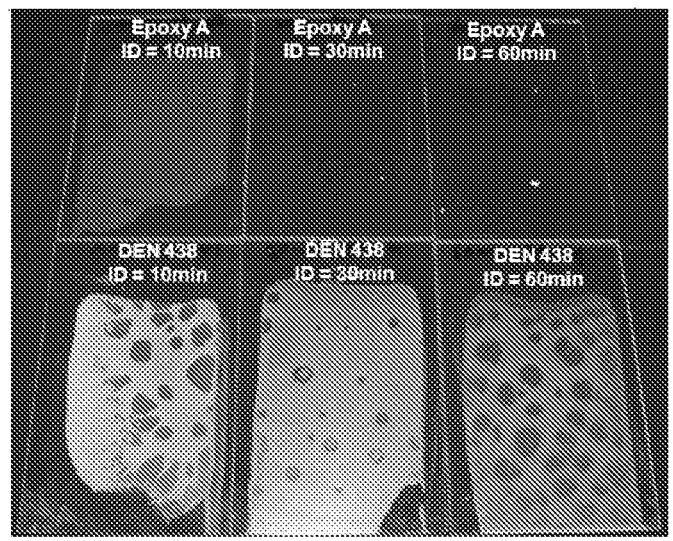
FIG. 2 depicts several photographs of cured films of Epoxy A and DEN 438 with MXDA, respectively, at different induction times.

As shown in FIG. 2, the cured films based on DEN 438 are non-transparent even with a 60 min induction time, indicating poor compatibility of the DEN 438 resin with the MXDA hardener. The Epoxy A cured film, on the other hand, is almost transparent with more than 10 min of induction time. The above results illustrate that Epoxy A has a much better compatibility with MXDA hardener than the compatibility of DEN 438 with MXDA.

Example 6 and Comparative Example 8

To evaluate the performance of the cardanol modified novolac and avoid interference from pigments and additives, in these examples, clear coats were prepared from formulations described in Table V.

A. Formulation Preparation

The ingredients/raw materials used in the designed formulations of these examples are listed in Table V. The Epoxy A product produced in Example 1 and DEN 438 were each mixed with 20 wt % xylene as described in Example 3 and Comparative Example 3.

PACM was used as hardener because this hardener is a cost effective cycloaliphatic amine hardener and is commonly used in the field of tank coatings. The epoxy/NH ratio in the formulation was equivalent (1:1 molar). The solvent was a blend of xylene, propylene glycol methyl ether (PM) and butyl cellosolve (BCS) with ratio of 4.2/1/2. The solids content of each of the formulations was set at 72 wt %.

TABLE V

Clear Coat Formulations

| Material | EEW/AHEW | Example 6 | Comparative Example 8 |
|---|---|---|---|
| 80% Epoxy A in xylene | 539 | 80.52 | |
| 80% DEN438 in xylene | 223 | | 69.85 |
| PACM | 52.5 | 7.84 | 16.44 |
| PM | | 3.88 | 3.87 |
| xylene | | 0.00 | 2.10 |
| BCS | | 7.76 | 7.74 |
| Total | | 100.00 | 100.00 |
| Solid content | | 0.72 | 0.72 |

B. Film Preparation

Q-panels, having a size of 100 millimeters (mm) by 150 mm and a thickness of 0.8 mm, were used as the substrate for testing the formulations of this Example 6 and Comparative Example 8. The formulations described in Table V were mixed well for 10 min and stored at room temperature for about 60 min. Coatings of the mixtures were applied on the Q-panels with a drawdown applicator with 120 microns (μm) of wet film thickness. Then the resultant wet films were dried and cured at a temperature of 23° C. (±2° C.) and at a relative humidity of 50% (±5%) for a specific number of days required before carrying out tests on the cured films. The dry film thickness was measured after drying under the above mentioned conditions for seven days. All of the resulting cured films had a dry film thickness in the range from 35 μm to 45 μm.

C. Performance Evaluation (1) Pot-Life of Curable Formulation

Figure 3:
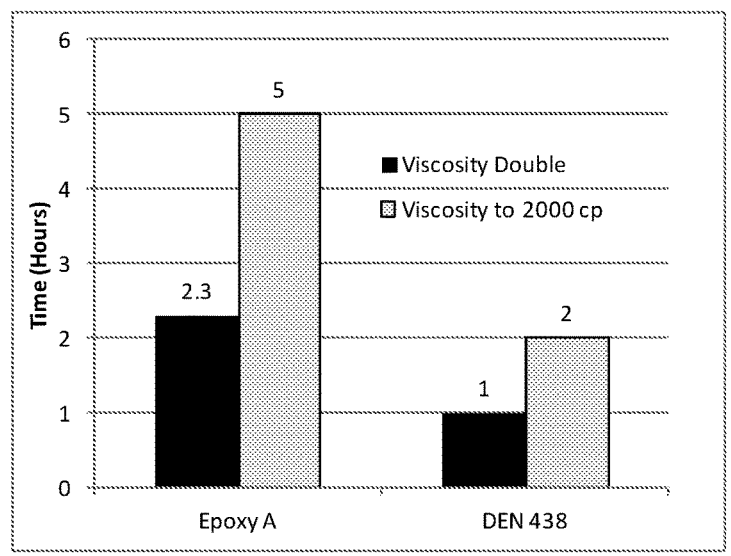
FIG. 3 is a graphical illustration showing the pot-life of Epoxy A and DEN 438.

"Pot-life" herein is the period of time during which a curable formulation remains useful after mixing. As shown in FIG. 3, the pot-life of the coating formulation containing the cardanol modified epoxy novolac resin composition (Epoxy A) of the present invention was longer than that of the curable formulation containing DEN 438. The longer pot-life is an advantage for the modified epoxies, especially for developing a high solid formulation that needs a longer pot-life.

(2) Chemical and Solvent Resistance of Cured Film

Figure 4:
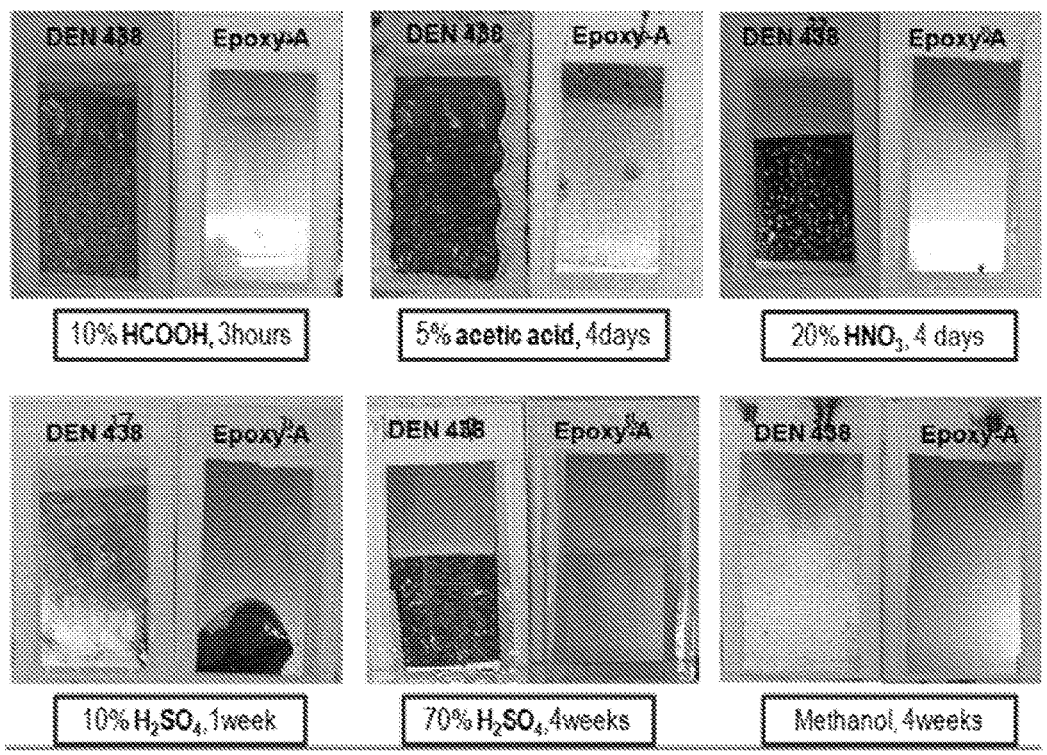
FIG. 4 shows several photographs of cured films and the films' resistance to 10% formic acid (HCOOH), 5% acetic acid ($CH_3COOH$), 20% nitric acid ($HNO_3$), 10% sulfuric acid ($H_2SO_4$), 70% $H_2SO_4$, and methanol ($CH_3OH$).

The chemical and solvent resistance of cured films was evaluated according to ISO 2812. The coating films were cured at room temperature for 14 days before testing. Photos of the test panels were taken and recorded to monitor the appearance change of the coatings by visual observation. As shown in FIG. 4, the cured films based on Epoxy A have a much better appearance than the cured films based on DEN 438, indicating that the cardanol modified novolac has better resistance to 10% $HCOOH$, 5% $CH_3COOH$, 20% $HNO_3$, 10% $H_2SO_4$, 70% $H_2SO_4$ and $CH_3OH$.

Figure 5:
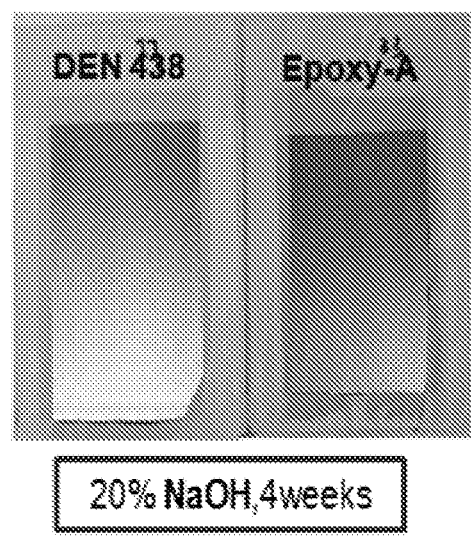
FIG. 5 is a photograph of cured films showing the resistance to 20% NaOH aqueous solution of the cured films.

Also, as shown in FIG. 5, the cured films based on Epoxy A and DEN 438 both kept intact without any blisters, rust, cracks or flaking after being immersed in 20% NaOH solution for 4 weeks. FIG. 5 indicates that the cured films, regardless of level or type of modification, exhibiting excellent alkali resistance.

In the above examples, a high purity cardanol was used to modified an epoxy novolac resin compound to achieve a much lower viscosity and a better compatibility with aliphatic and aromatic amine hardeners. The modified epoxy novolac can be used for high solid and low VOC formulations. The evaluation results as described above show that the cardanol modified epoxy novolac resin composition of the present invention has an extended pot-life, improved flexibility, improved impact resistance, excellent chemical resistance, and excellent solvent resistance.

The invention claimed is:

1. A modified epoxy novolac resin composition comprising a compound having the following structure:

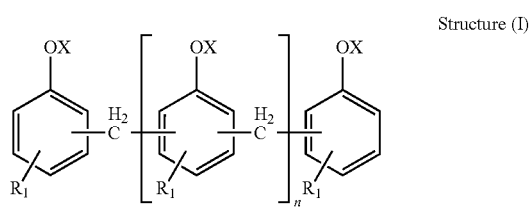

Structure (I)

wherein X is

Structure (II)

-continued

Structure (III)

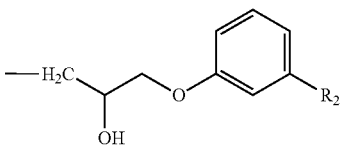

wherein the X moieties represented by Structure (III) are present in the composition at a concentration of about 15 weight percent to about 40 weight percent; and wherein: $R_1$ is hydrogen or alkyl group of from 1-12 carbon atoms, $R_2$ is a straight-chain with 15 carbons containing 0 to 3 C=C bond(s) selected from —$C_{15}H_{31}$, —$C_{15}H_{29}$, —$C_{15}H_{27}$, and —$C_{15}H_{25}$, and n is a numeral from 1 to 10.

2. The modified epoxy novolac resin composition of claim 1, having a viscosity of less than about 4,000 mPa·s at 70° C.

3. A curable epoxy novolac resin composition comprising:
(i) the modified epoxy novolac resin composition of claim 1; and
(ii) at least one hardener compound.

4. The curable resin composition of claim 3, further comprising an epoxy compound different from the modified epoxy novolac resin composition (i).

5. The curable resin composition of claim 3, wherein the at least one hardener compound comprises an amine hardener, and the curable resin composition features an epoxide to amine hydrogen equivalent ratio of from about 0.3:1 to about 1.3:1.

6. The curable resin composition of claim 3, wherein the at least one hardener compound comprises an amine hardener, and the curable resin composition features an epoxide to amine hydrogen equivalent ratio of from about 0.6:1 to about 1.2:1.

7. The curable resin composition of claim 3, wherein the at least one hardener compound comprises an amine hardener, and the curable resin composition features an epoxide to amine hydrogen equivalent ratio of from about 0.7:1 to about 1.0:1.

8. The curable resin composition of claim 3, wherein the at least one hardener compound comprises an amine hardener.

9. The curable resin composition of claim 3, wherein the modified epoxy novolac resin composition (i) and the at least one hardener compound (ii) exhibit a compatibility sufficient to provide the curable resin composition with an induction time of from about 30 minutes to about 60 minutes.

10. The curable resin composition of claim 3, having a pot-life of greater than or equal to 60 minutes.

11. The curable resin composition of claim 3, having a solids content of from about 50 weight percent to about 80 weight percent.

12. A process for preparing a curable epoxy novolac resin composition comprising admixing: (i) the modified epoxy novolac resin composition of claim 1, and (ii) at least one hardener compound.

13. A coating comprising a reaction product of:
(I) the modified epoxy novolac resin composition of claim 1;
(II) at least one hardener compound; and
(III) optionally, a pigment.

14. The coating of claim 13, wherein the coating exhibits a chemical resistance property when the coating is subject to a chemical substance selected from the group consisting of formic acid, acetic acid, nitric acid, sulfuric acid, and methanol.

15. The coating of claim 14, wherein the coating exhibits an observable increase in chemical resistance compared to a coating made from a conventional epoxy novolac resin compound; wherein the chemical resistance is from 0 to about 3 as measured by a numerical rating scale of 0 to 5 wherein "0" means no blistering is observed and "5" means blistering is observed.

16. A process for preparing a thermoset comprising:
(i) providing an admixture of: (I) the modified epoxy novolac resin composition of claim 1 and (II) at least one hardener compound, to form a curable composition; and
(ii) curing the curable composition of step (i).

17. A cured thermoset article prepared by the process of claim 16.

18. A modified epoxy novolac resin composition comprising a reaction product of a reaction mixture comprising: (a) a novolac epoxy resin compound, (b) a cardanol compound, and (c) a catalyst compound; wherein the reaction product features both reacted and unreacted epoxy groups of (a), said reacted epoxy groups are a ring opening reaction product of an epoxy group of (a) and the hydroxyl group of (b); and wherein the reacted epoxy groups are present in the composition at a concentration of about 15 weight percent to about 40 weight percent.

19. The modified epoxy novolac resin composition of claim 18, wherein the cardanol compound, component (b), has a purity of at least 80 percent.

20. The modified epoxy novolac resin composition of claim 18, wherein the cardanol compound, component (b), has a purity of from at least 80 percent to about 100 percent.

21. The modified epoxy novolac resin composition of claim 18, wherein the novolac epoxy resin compound, component (a), is derived from phenol.

22. The modified epoxy novolac resin composition of claim 18, wherein the novolac epoxy resin compound, component (a), is represented by the following structure:

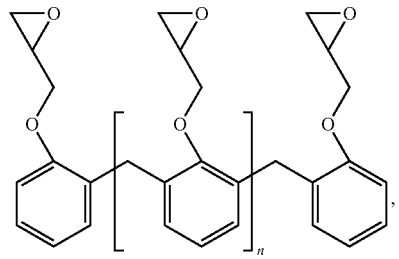

wherein n is a numeral from 1 to 10.

23. The modified epoxy novolac resin composition of claim 18, wherein the catalyst compound, component (c), is a phosphonium salt.

24. The modified epoxy novolac resin composition of claim 18, wherein the catalyst compound, component (c), is ethyl triphenyl phosphonium acetate.

25. The modified epoxy novolac resin composition of claim 18, wherein component (a) is present in the reaction mixture at a concentration of from about 40 weight percent to about 85 weight percent; wherein component (b) is present in the reaction mixture at a concentration of from about 15 weight percent to about 60 weight percent; and wherein component (c) is present in the reaction mixture at a concentration of from about 50 parts per million to about 1,000 parts per million.

26. A process for preparing a modified epoxy novolac resin composition comprising forming a reaction product of a reaction mixture comprising: (a) a novolac epoxy resin compound, (b) a cardanol compound, and (c) a catalyst compound; wherein the reaction product features both reacted and unreacted epoxy groups of (a), said reacted epoxy groups are a ring opening reaction product of an epoxy group of (a) and the hydroxyl group of (b); and wherein the reacted epoxy groups are present in the composition at a concentration of about 15 weight percent to about 40 weight percent.

* * * * *